US010582819B2

(12) United States Patent
Sickler et al.

(10) Patent No.: US 10,582,819 B2
(45) Date of Patent: Mar. 10, 2020

(54) VACUUM PLATE AND VACUUM SYSTEM

(71) Applicants: Perry Sickler, Endicott, NY (US); Edward Calafut, Vestal, NY (US)

(72) Inventors: Perry Sickler, Endicott, NY (US); Edward Calafut, Vestal, NY (US)

( * ) Notice: Subject to any disclaimer, the term of this patent is extended or adjusted under 35 U.S.C. 154(b) by 933 days.

(21) Appl. No.: 14/453,168

(22) Filed: Aug. 6, 2014

(65) Prior Publication Data
US 2015/0040948 A1 Feb. 12, 2015

Related U.S. Application Data

(60) Provisional application No. 61/863,144, filed on Aug. 7, 2013.

(51) Int. Cl.
| | | |
|---|---|---|
| *A47L 5/36* | (2006.01) | |
| *B62B 1/20* | (2006.01) | |
| *A47L 7/00* | (2006.01) | |
| *A47L 9/22* | (2006.01) | |
| *E01H 1/08* | (2006.01) | |

(52) U.S. Cl.
CPC ............ *A47L 5/365* (2013.01); *A47L 7/0004* (2013.01); *A47L 7/0019* (2013.01); *A47L 7/0023* (2013.01); *A47L 7/0028* (2013.01); *A47L 7/0042* (2013.01); *A47L 9/22* (2013.01); *B62B 1/204* (2013.01); *A47L 5/36* (2013.01); *B62B 2202/50* (2013.01); *E01H 1/0827* (2013.01)

(58) Field of Classification Search
CPC ...... A47L 7/0004; A47L 7/0028; A47L 5/365; A47L 7/0042; B62B 1/204
See application file for complete search history.

(56) References Cited

U.S. PATENT DOCUMENTS 3,618,297 A * 11/1971 Hamrick ............... A47L 7/0047
96/406
3,858,272 A * 1/1975 Bard ...................... A47L 5/365
16/405

(Continued)

FOREIGN PATENT DOCUMENTS

DE 29909163 U1 * 1/2000 ............. A47L 5/365
DE 29909163 U1 * 1/2000 ............. A47L 5/365

(Continued)

OTHER PUBLICATIONS

Supplemental Partial European Search Report for EP14833646, dated Jun. 30, 2106.

(Continued)

*Primary Examiner* — Bryan R Muller
(74) *Attorney, Agent, or Firm* — Brown & Michaels, PC

(57) ABSTRACT

A vacuum plate converts a conventional wheelbarrow into a wet and dry dual purpose vacuum cleaner receptacle. Collection of fluids and solids directly into a wheelbarrow simplifies larger cleaning tasks, small flood remediation, transport of bulk particulate materials such as sand, pea stone, and mulch, and allows hydro-excavation to be carried out in home improvement and small scale professional landscaping projects. A fluid level sensor prevents the wheelbarrow from overflowing when collecting large quantities of fluid, and a sump pump allows fluids to be drained from collected slurries, leaving only solids in the wheelbarrow for reuse or independent disposal.

18 Claims, 13 Drawing Sheets

(56) References Cited

U.S. PATENT DOCUMENTS

| | | | |
|---|---|---|---|
| 3,869,265 A | | 3/1975 | Wolter et al. |
| 4,207,649 A | * | 6/1980 | Bates ................ A47L 11/34 |
| | | | 15/319 |
| 4,222,145 A | | 9/1980 | Lowder |
| 4,246,676 A | * | 1/1981 | Hallsworth ......... A47L 7/0028 |
| | | | 15/353 |
| 5,364,241 A | * | 11/1994 | Schultz ................ F04B 33/00 |
| | | | 215/260 |
| 6,170,118 B1 | * | 1/2001 | McIntyre ............. A47L 5/365 |
| | | | 15/323 |
| 8,091,815 B2 | * | 1/2012 | Tardif .................. A01G 3/002 |
| | | | 241/100 |
| 8,418,312 B2 | * | 4/2013 | Rhea ..................... A47L 5/14 |
| | | | 15/320 |
| 8,997,658 B2 | * | 4/2015 | Pipkorn ................ B62B 1/20 |
| | | | 108/42 |
| 2004/0025286 A1 | * | 2/2004 | Boys ................... A47L 5/365 |
| | | | 15/353 |
| 2004/0088817 A1 | | 5/2004 | Cochran et al. |
| 2010/0294867 A1 | | 11/2010 | Tardif |
| 2011/0283475 A1 | * | 11/2011 | Cappuccio ......... A47L 7/0014 |
| | | | 15/327.1 |
| 2012/0311811 A1 | | 12/2012 | Hollis et al. |
| 2018/0078104 A1 | * | 3/2018 | Register ............. A47L 7/0047 |

FOREIGN PATENT DOCUMENTS

| | | | | |
|---|---|---|---|---|
| DE | 102008044674 | A1 | | 3/2010 |
| EP | 1600090 | A2 | * | 11/2005 ............ A47L 5/365 |
| EP | 1600090 | A2 | * | 11/2005 ............ A47L 5/365 |
| EP | 1920698 | A1 | | 5/2008 |
| JP | 3172985 | U | | 1/2012 |
| KR | 10-2004-0034390 | A | | 4/2004 |
| WO | 2013108095 | A1 | | 7/2013 |

OTHER PUBLICATIONS

International PCT Search Report for PCT/US2014/050132; dated Nov. 24, 2014; 10 pages.

* cited by examiner

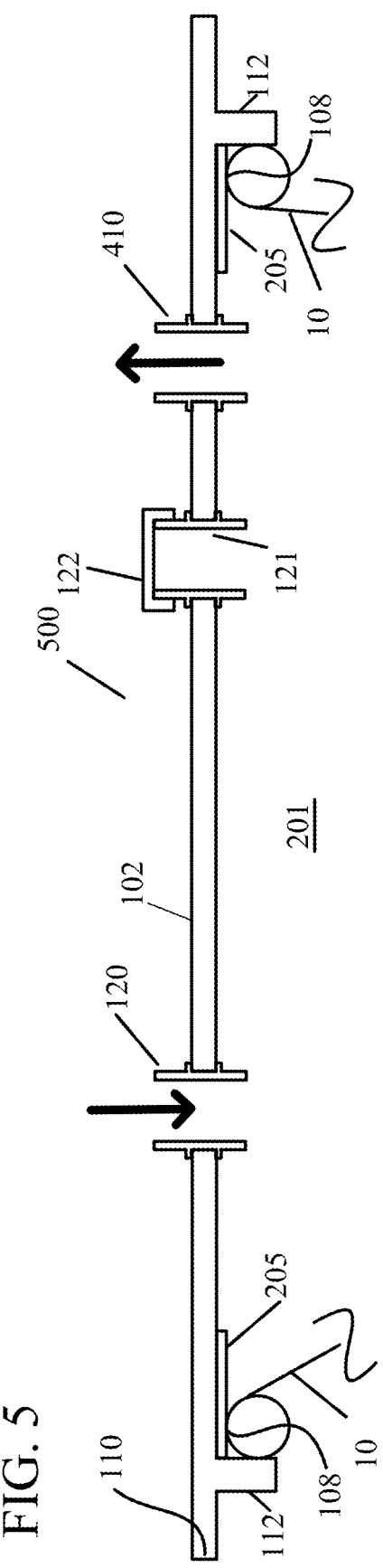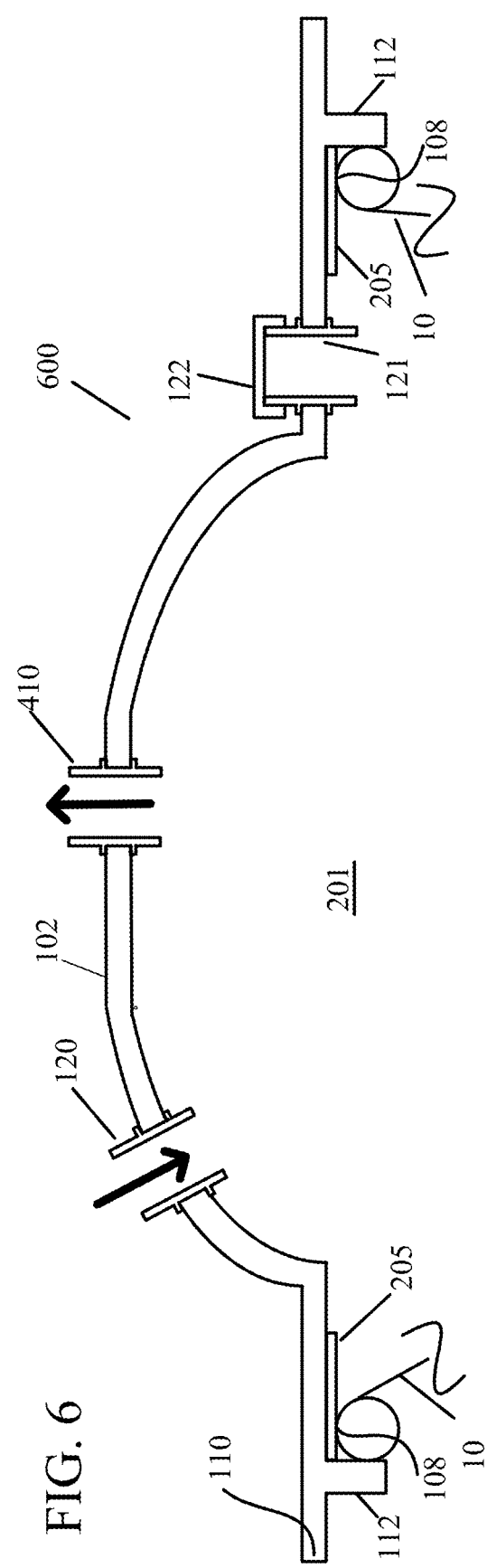

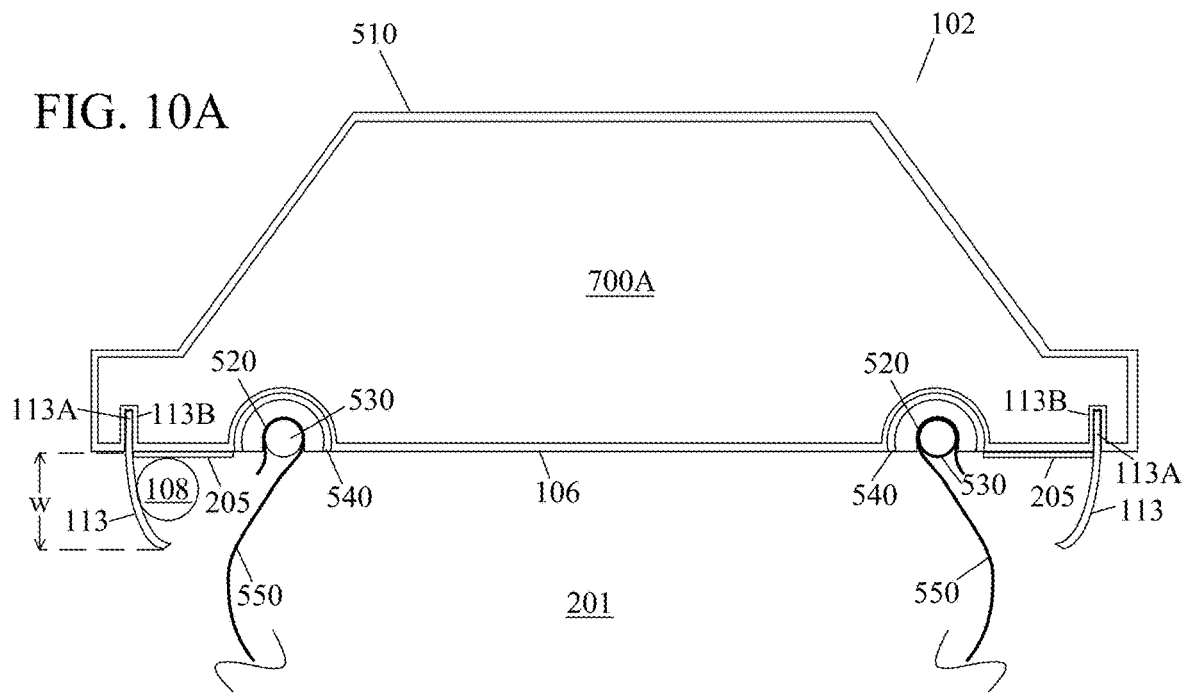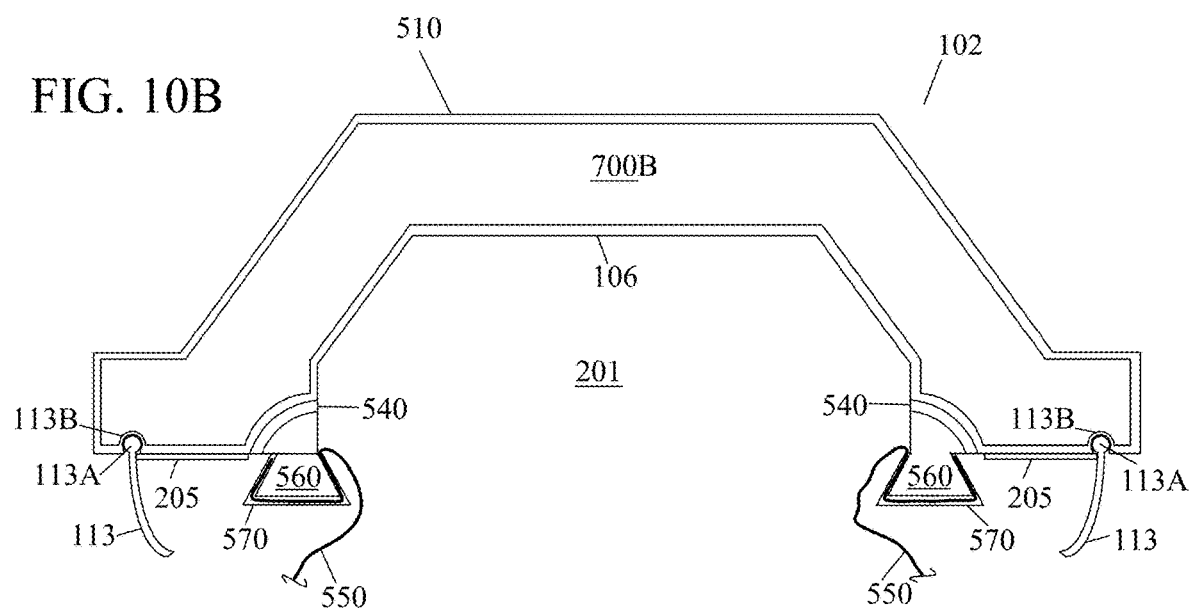

VACUUM PLATE AND VACUUM SYSTEM

REFERENCE TO RELATED APPLICATIONS

This application claims one or more inventions which were disclosed in Provisional Application No. 61/863,144, filed Aug. 7, 2013, entitled "Vacuum Plate". The benefit under 35 USC § 119(e) of the United States provisional application is hereby claimed, and the aforementioned application is hereby incorporated herein by reference.

BACKGROUND OF THE INVENTION

Field of the Invention

The invention pertains to the field of vacuum cleaners. More particularly, the invention pertains to dual use wet and dry vacuum cleaners for liquid, particulate matter, or a combination of both, and an apparatus for converting a wheelbarrow for use as a wet and dry vacuum cleaner.

Description of Related Art

Dual use wet/dry vacuum cleaners have been available for both home and commercial use for some time. Home use models are oriented toward small cleaning tasks, such as collecting spilled fluids, and as a result include one form of canister or another ranging from 6 gallon to 20 gallon capacities. Industrial grade wet/dry vacuum cleaners are also available, with similar specifications as home use models, but higher grade components directed toward the rigors of harsh use in janitorial, construction, and other similar uses. Further, truck mounted vacuum systems are available for commercial carpet cleaning, for example. Still larger truck mounted vacuum systems are available and employed in a variety of applications.

Large truck mounted systems may be used for removing water and debris after severe flooding, or as a result of fire damage to structures, for example. In other uses, truck mounted vacuum systems are employed in a number of construction related tasks. In one example, slot trenching, and hydro-excavation in general, pressurized water is used to loosen and remove soils in locations that digging tools, such as shovels or backhoes, cannot easily access. Similarly, hydro-excavation may be used to create narrow trenches that would be inconvenient to dig with conventional tools, for example when trenching for installation of lawn sprinkler systems.

High pressure water is used to loosen soil, and the resulting slurry of soil, small rocks, and water is immediately collected through a vacuum nozzle connected via a hose to a truck mounted vacuum system for removal. Similarly, post holes may be excavated in this manner by directing the high pressure water and a vacuum nozzle vertically downward into the ground to excavate a hole; underground utilities may thus be exposed without fear of damage to wires or piping; catch basins, drains and other sensitive structures may be rapidly and easily cleaned; and excavations may be performed remotely, in a basement for example, with the advantages of heavy equipment but in locations not readily accessible to heavy equipment.

However, home use wet/dry vacuum cleaners are limited in both their collection capacity and vacuum capacity. A large home use wet/dry vacuum cleaner with a 20 gallon capacity canister would weigh more than 160 lbs. when filled only with water. Even when the canister is mounted on wheels, this weight is unwieldy to move and empty, particularly when moving the filled canister from a basement location to an outdoor location, for example. Consumer systems are also generally not designed for outdoor use in landscaping or construction projects. Additionally, the vacuum pumps of home use wet/dry vacuum cleaners are of limited horsepower, and thus are more appropriate for cleaning small fluid spills or small debris, and are generally not effective with lengthy hoses.

On the other end of the spectrum, large commercial truck mounted vacuum systems are costly to operate, and although they may use long hoses to reach locations remote from the actual truck they are mounted on, the trucks involved are heavy and may damage lawns and other access ways when attempting to get close to the job site they are to be used on.

SUMMARY OF THE INVENTION

A vacuum plate system converts a conventional wheelbarrow into a wet/dry dual purpose vacuum system and collection volume. Collection of fluids, solids, or a combination of both, directly into a wheelbarrow simplifies larger cleaning tasks, small flood remediation, transport of bulk particulate materials such as sand, pea stone, and mulch, and allows hydro-excavation to be carried out in home improvement and small scale professional landscaping projects. A fluid level sensor prevents the wheelbarrow from overflowing when collecting large quantities of fluid, and a sump pump allows fluids to be drained from collected slurries, leaving only solids in the wheelbarrow for reuse or independent disposal. In some embodiments, the vacuum plate may also provide mating surfaces that seal to the rim of a 55 gallon metal drum, from which the top surface has been removed, and alternatively may be used as a collection volume with the same vacuum plate system.

BRIEF DESCRIPTION OF THE DRAWINGS

FIG. 5 shows a midline cross sectional view of a planar vacuum plate system for use with an external vacuum pump.

FIG. 6 shows a midline cross sectional view of a raised vacuum plate system for use with an external vacuum pump.

FIG. 10A shows a cross section of a raised vacuum plate body formed from a foam core approximating a dome with a sealant coating and flat bottom.

FIG. 10B shows a cross section of a raised vacuum plate body formed from a foam core approximating a dome with a sealant coating and a dome shaped lower surface.

DETAILED DESCRIPTION OF THE INVENTION

Figure 1:
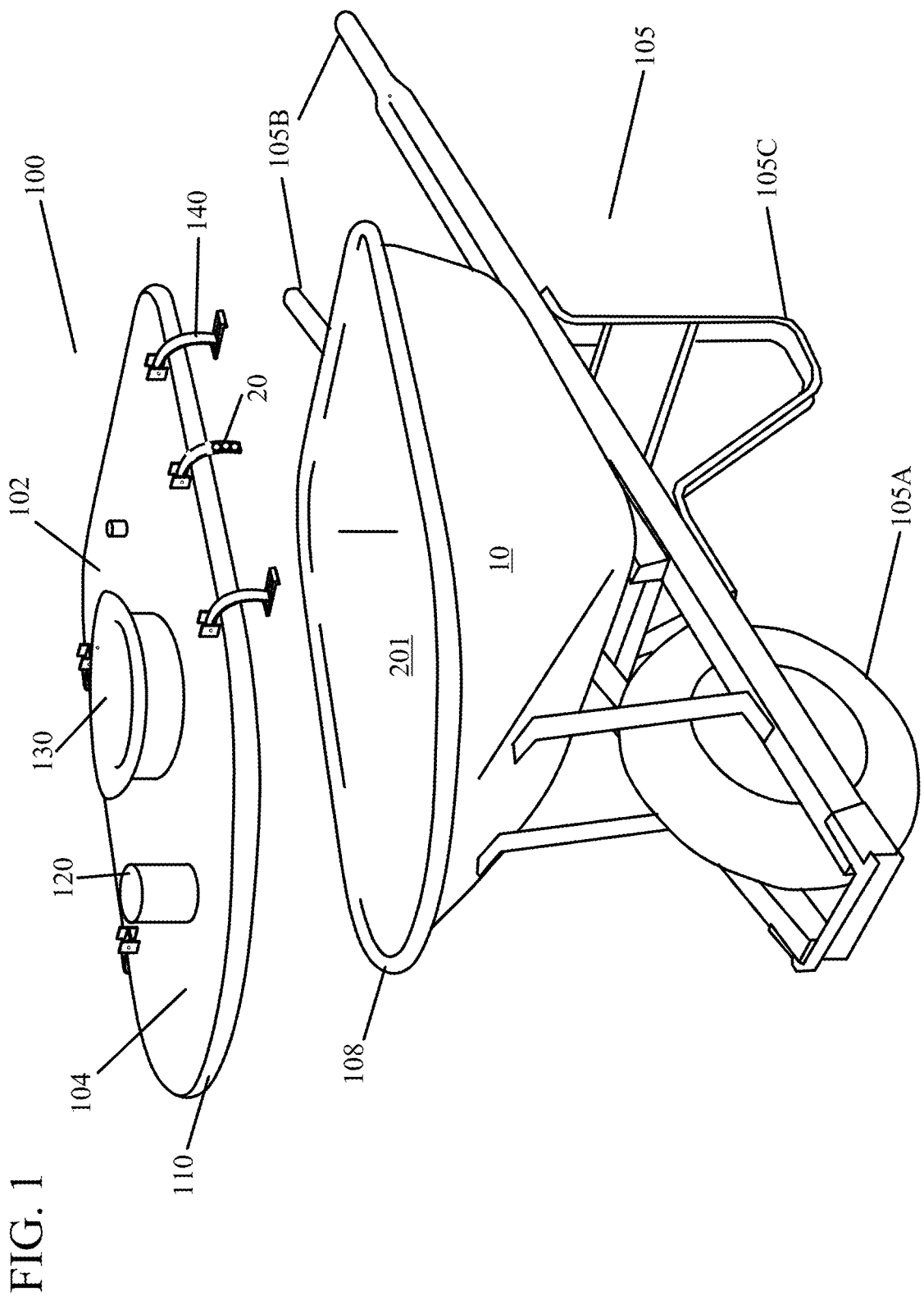
FIG. 1 shows a perspective view of a vacuum plate system and a conventional wheelbarrow which together form a wet/dry vacuum with a collection volume.

The vacuum plate system 100, 200, 300, 400, 500, 600, 700, 1000 described herein, and shown for example in one embodiment in FIG. 1, is designed to form a wet/dry vacuum cleaner when combined with a conventional wheelbarrow 105, where the conventional wheelbarrow 105 tray 10 defines a collection volume 201 for collected fluids and solids. Generally a wheelbarrow 105 includes at least one front wheel 105A, two handles 105B for moving the wheelbarrow 105 and also forming a support structure for the tray 10, and a pair of supports 105C at the rear of the wheelbarrow 105 supporting the rear of the wheelbarrow 105 when it is in a parked position. This representation of a wheelbarrow 105 is illustrative only, and any configuration of wheelbarrow 105 having a tray 10 known in the art may be used, and this representation should not be considered limiting of the vacuum plate system embodiments 100, 200, 300, 400, 500, 600, 700, 1000 described herein.

The vacuum plate system 100 generally includes a vacuum plate body 102 having at least an upper surface 104 and a perimeter 110 shaped to generally match and mate to the perimeter 108 of a wheelbarrow 105 tray 10. The vacuum plate system 100 may have an integrated vacuum pump 130 and at least one intake port 120 passing through the vacuum plate body 102 from the upper surface 104 of the vacuum plate body 102. The intake port 120 may typically have a 2 inch diameter, a 4 inch diameter, or other standard vacuum coupling dimension, or may alternatively have any diameter that is advantageous for a given configuration.

The vacuum plate body 102 may be attached to the wheelbarrow 105 tray 10 in some embodiments through the use of straps 140 that clip to the perimeter 108 of the wheelbarrow 105 tray 10. Thus, when the vacuum plate system 100 is connected to the wheelbarrow 105 tray 10, the inner volume of the wheelbarrow 105 tray 10 forms and defines an evacuated collection volume 201 when the vacuum pump 130 is activated. Material collected through a vacuum hose (not shown in this figure) attached to the inlet port 120 may then be drawn into the evacuated collection volume 201.

Because of the large collection volume 201 and high mobility of the wheelbarrow 105, collected fluids and solids may be conveniently moved after collection in the wheelbarrow 105 to a disposal area without having to make intermediate transfers between a vacuum cleaner canister and a transport receptacle.

Intermediate transfers are time consuming, add unnecessary labor, and extend the time needed to perform certain operations, where large amounts of fluid and/or solids are to be removed for disposal, and may often result in spillage during transfer and transport. Conventional home use or commercial wet/dry vacuum cleaners have only limited volume canisters that rapidly fill and must frequently be emptied, further complicating their use in collecting large volumes of debris or fluid. For example, a typical home use wet/dry vacuum canister generally has a maximum capacity of less than 20 gallons, and a typical commercial wet/dry vacuum may have a maximum capacity of about 30 gallons. A commercially available wheelbarrow, on the other hand, may have a capacity of between 44 and 75 gallons. Tests of the vacuum plate system 100, 200, 300, 400, 500, 600, 700, 1000 described herein have shown capabilities of filling a wheelbarrow 105 tray 10 in less than one minute.

Some examples of operations for which the vacuum plate system embodiments 100, 200, 300, 400, 500, 600, 700, 1000 described herein may be suited include, but are not limited to:

Landscaping Architecture—Constructing landscaping features, such as brick patios, planting beds, and other features, often requires the use of large quantities of topsoil, sand, crushed stone, mulch, wood chips, and other materials that are either particulate, pelletized, granular, or other small geometries. In practice, these materials are ordered by the cubic yard, delivered in dump trucks from a supplier, and dumped in piles at a home owner's property. These bulk materials may be dumped a large distance from where they are needed due to limited access of delivery trucks to job site locations.

This practice requires landscapers and home owners to expend time and manpower to shovel the bulk materials into wheelbarrows at the delivery location, and move them to the location of the project, such as a brick patio building site, for example. With the vacuum plate system 100 described herein, bulk materials may be vacuumed directly into a wheelbarrow 105 for transport. Thus, hours of time consuming and backbreaking shoveling of bulk materials from delivery piles to wheelbarrows for transport to a location where they are needed may be saved.

Basement Flooding—Basement flooding is not uncommon as a result of heavy rain, malfunctions of washing machines, sump pump malfunctions, failure of basement wall seals, or catastrophic flooding of rivers and streams. Many homes do not have drains located in their basements, and the water infiltrating basements may need to be pumped out by a professional remediation service. The vacuum plate system 100 described herein may be easily located near a basement window and a vacuum hose introduced to the below ground space, so that flood water may be suctioned out into the wheelbarrow 105 tray 10. The large collection volume 201 and mobility of the wheelbarrow 105 allows relatively large quantities of water, often contaminated with solids, oils, or other detritus, to be removed and easily transported to a location distant from the home for disposal.

A conventional home wet/dry vacuum cleaner would potentially require many trips for this purpose and would not necessarily have the suction power compatible with using a lengthy hose. As a result, a conventional wet/dry vacuum may need to be carried through the home when full, potentially resulting in spillage in other areas of the home. Alternatively, the cost and logistics of hiring a professional using a truck mounted system to remove smaller quantities flood waters may be disproportionately large compared to the amount of water or debris to be removed.

Post Hole Digging—Farmers, landscape professionals, and home owners routinely dig post holes for a variety of purposes. Often this requires that they purchase or rent relatively expensive gas powered auger type post hole diggers that are independent devices or attachable to the three point hitches on farm equipment. The vacuum plate system 100 described herein makes small scale hydro-excavation available for even small jobs in residential or farming environments. Attaching a high pressure water pump to a secondary high pressure water hose in parallel with a vacuum hose connected to the vacuum plate system 100 described herein provides both high pressure water and high vacuum necessary for hydro-excavation. The high pressure water breaks up soils near the vacuum nozzle, and the resulting slurry is collected directly into a wheelbarrow 105 tray 10. Subsequently to, or during the hydro-excavation, the water may be removed from the collected slurry, and the soil collected from the slurry may be returned to the post hole after a post has been set in place. Unneeded soils may be conveniently transported to another location for reuse or disposal as appropriate without excessively spreading soil on lawns around the post hole for example.

Lawn Sprinkler Installation—Installation of automatic lawn sprinkler systems requires digging holes for sprinkler heads, as well as a network of slot trenches to accommodate buried plastic water pipes that feed the sprinkler heads and connect them to a distribution manifold, control system, and water main supply. To avoid frost heaving and damage to the buried components of sprinkler systems, the slot trenches must be dug to at least a minimum depth. This task is time consuming and manpower intensive using spades or other manual tools, and may risk damaging buried utilities, particularly near homes. While gas powered trenching equipment is available, such equipment merely removes soil from the trench and deposits it in furrows on the lawn on either side of the trench. Mechanical trenching equipment may therefore leave residues on the lawn after pipe installation and extend the time required for the trenches to regrow grass and fit in with the pre-existing lawn cover. Either method of trenching also risks damaging buried utilities such as power lines and water services.

Once overlying sod has been removed to define slot trench pathways, the vacuum plate system 100, 200, 300, 400, 500, 600, 700, 1000 embodiments described herein may be used in hydro-excavation to rapidly create slot trenches and collect soils removed from these trenches into a wheelbarrow 105 tray 10 so the materials removed from the trenches may be stored and used to back fill the trenches after piping is installed, with minimal residues remaining on the surrounding lawn, and without risk of damaging pre-existing underground utility wires or piping.

Catchment and Drain Cleaning—Gutters, driveway drains, and other similar water collection structures often require annual cleaning to remove leaves, tree seeds, dried mud, and other forms of debris. Cleaning must often be done by hand and requires collected materials to be carried off in buckets or other receptacles for disposal or composting. Embodiments of the vacuum plate system 100, 200, 300, 400, 500, 600, 700, 1000 described herein may be used, with or without fluids supplied from a pressure washer nozzle or garden hose, to remove debris rapidly and non-destructively, and directly collect them in large collection volumes 201 in a wheelbarrow 105 tray 10 for immediate transport to a disposal area or compost heap.

Referring further to FIG. 1, an embodiment of the vacuum plate system 100 is shown in perspective view along with a conventional wheelbarrow 105 that is commonly available from a number of sources. An outer perimeter 110 of the vacuum plate body 102 is at least as large as the upper perimeter 108 of the wheelbarrow 105 tray 10 to which it is to be mated. It will be appreciated that this embodiment is only used for illustrative purposes only, and since wheelbarrows 105 are available in various sizes and shapes, the outer perimeter 110 of the vacuum plate body 102 may be arranged accordingly: for example, shaped and sized to match the upper perimeter 108 of a given type or class of commercially available wheelbarrow 105 tray 10. Alternatively, a more generic shape that will accommodate the upper perimeters 108 of a wide range of wheelbarrow 105 tray 10 geometries may be used.

Figure 2:
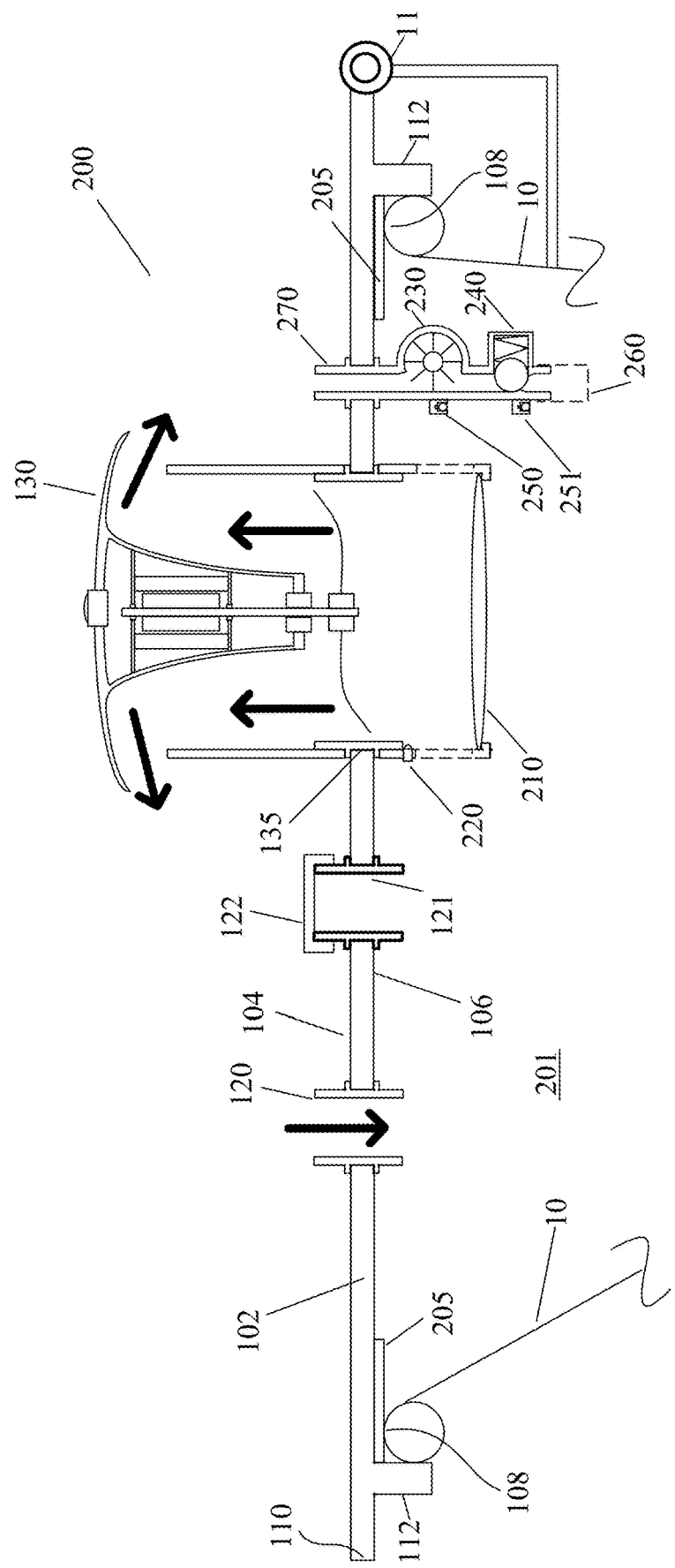
FIG. 2 shows a midline cross sectional view of a wet/dry vacuum plate system with a planar vacuum plate body.

Referring now to FIG. 2, the vacuum plate body 102 has an upper surface 104 and a lower surface 106, and in this embodiment 200 an outer perimeter 110 which corresponds to, but is at least slightly larger than, the upper perimeter 108 of the wheelbarrow 105 tray 10. The vacuum plate body 102 may include one of more inlets 120, 121, with covers 122 sealing ports that may not be in use at any given time.

The vacuum plate body 102 may also include an integrated vacuum pump 130. In this example, a single stage vacuum pump 130 that exhausts air evacuated from the evacuated collection volume 201 through the vacuum pump 130 for cooling of drive components is shown. However, a dual stage vacuum pump 130 with independent pumping stages for collection volume 201 evacuation and motor cooling may also be used.

The vacuum pump 130 may be driven by an electric motor or a gasoline engine. In contrast to conventional wet/dry vacuum systems that have vacuum pump 130 horsepower (HP) ratings of approximately 6.5 HP or less, the vacuum pump 130 used in conjunction with the vacuum plate body 102 embodiments described herein may be capable of supporting significantly higher vacuum pump 130 horsepower ratings, in excess of 10 HP.

In one embodiment, shown in FIG. 2, a flange 112 is optionally provided extending downward from the lower surface 106 of the vacuum plate body 102 and, together with the lower surface 106 of the vacuum plate body 102 and gasket 205, forms a mating surface to mate with and seal to the perimeter 108 of the wheelbarrow 105 tray 10. The vacuum plate body 102 may be completely separable from the wheelbarrow 105, or as shown in FIG. 2, may be permanently attached to the wheelbarrow 105 by means of a hinge 11 or similar mechanism that allows the vacuum plate body 102 to mate to the wheelbarrow 105 tray 10, and alternatively be opened to allow emptying of the tray 10. Although the flange 112 is shown as forming a mating surface with the wheelbarrow tray 10 in FIG. 2, in some embodiments, the flange 112 is located outside the perimeter 108 of the wheelbarrow tray 10 and does not contact the wheelbarrow tray 10 during operation of the vacuum plate but instead serves to prevent the vacuum plate from sliding off the wheelbarrow tray 10 during transport, when the vacuum pump is off.

The vacuum created within the collection volume 201 formed inside the wheelbarrow 105 tray 10 when the vacuum plate body 102 is in place on the wheelbarrow 105 tray 10, and the vacuum pump 130 is activated, may be significant and sufficient to firmly seal the vacuum plate body 102 to the wheelbarrow upper perimeter 108. Thus, the flange 112 may be omitted in some embodiments as the mating surface formed by the gasket 205 on the lower side 106 of the vacuum plate body 102 may sufficiently seal the vacuum plate body 102 to the wheelbarrow 105 tray 10 perimeter 108. The gasket 205 may be formed of any resilient material, such as rubber, cork, closed cell polyethylene foam sheeting, or other similar materials.

Figure 3:
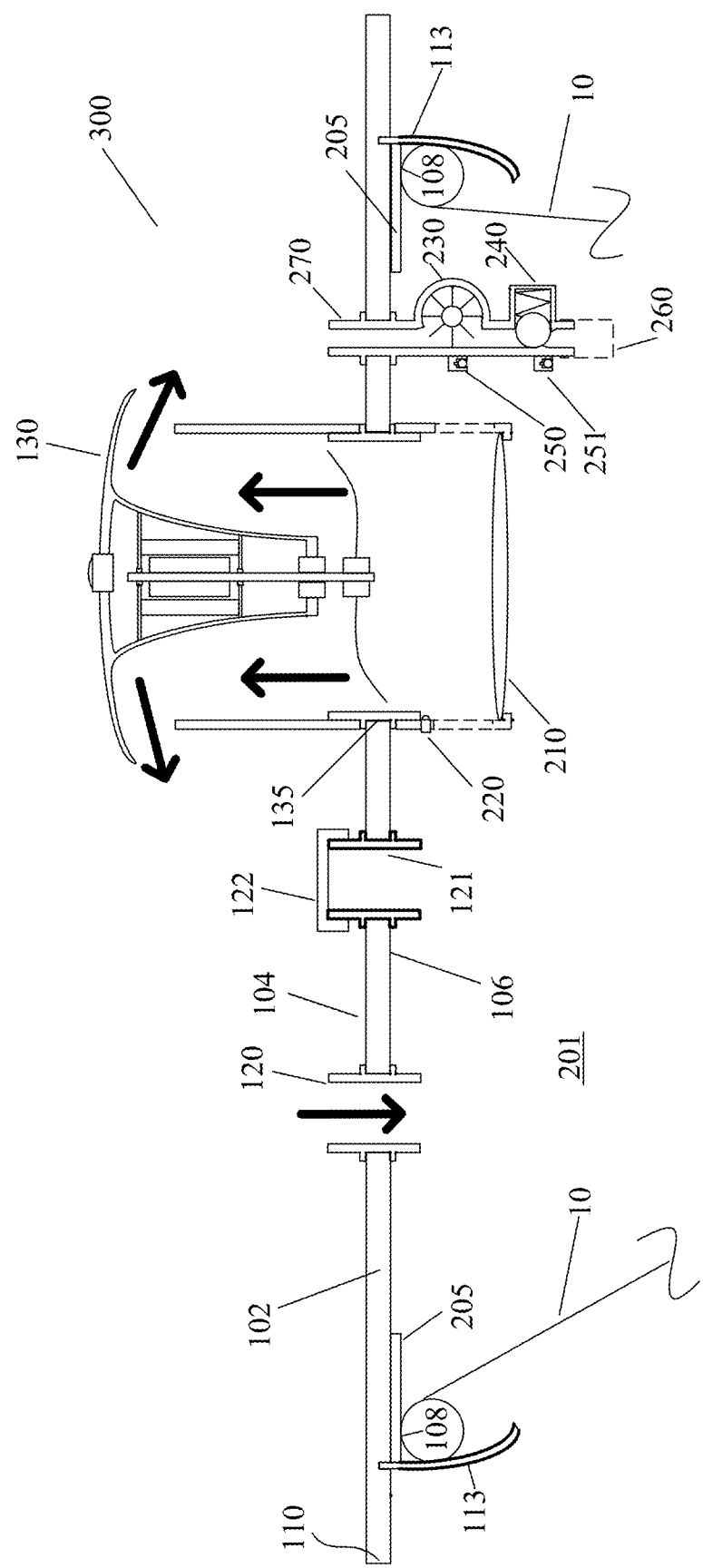
FIG. 3 shows a midline cross sectional view of a wet/dry vacuum plate system with a planar vacuum plate body and an elastic skirt for coupling to a wheelbarrow.

In some embodiments 300, as shown in FIG. 3, an elastic skirt 113 may be included along the lower surface 106 of the vacuum plate body 102, extending downwardly adjacent the perimeter 110 of the vacuum plate body 102. The elastic skirt 113 may be included in addition to, or alternatively to, the flange 112 of FIG. 2. The elastic skirt 113 may be formed of a continuous loop of elastic material, including but not limited to silicon rubber, vulcanized rubber, or any other elastic sheet material capable of expanding to allow the elastic skirt 113 to be stretched when the vacuum plate body 102 is being positioned on the wheelbarrow 105 tray 10 perimeter 108, and then contracting to seal the vacuum plate body 102 to the wheelbarrow 105 tray 10 perimeter 108 once the vacuum plate body 102 and gasket 205 are in contact with the wheelbarrow 105 tray 10 perimeter 108.

The elastic skirt 113 thus holds the vacuum plate body 102 in place on the wheelbarrow 105 tray 10 perimeter 108 regardless of whether the vacuum pump 130 is activated or not, and provides an additional vacuum seal that actively conforms to the wheelbarrow 105 tray 10 perimeter 108 in the event irregularities in the perimeter 108 of the wheelbarrow 105 tray 10 exist and do not firmly mate and seal with the gasket 205 on the lower side 106 of the vacuum plate body 102. Additionally, the elastic skirt 113 may inhibit spillage of fluids from the collection volume 201, when the wheelbarrow 105 is being moved from one location to another location.

As shown for example in FIG. 10A, the elastic skirt 113 preferably has a downward extension, "w", such that it covers a substantial portion of the wheelbarrow 105 tray 10 perimeter 108 when the vacuum plate 102 is in place. The lower side 106 of the vacuum plate 102 may have a channel 113B for holding one edge 113A of the elastic skirt 113 firmly to the vacuum plate 102. In one embodiment, the channel 113B may be a simple slot into which one edge 113A of the elastic skirt 113 is inserted, and held in place by adhesives, or through surface features on the edge 113A, creating friction with the channel 113B so that the elastic skirt may be removed and replaced if necessary.

In another embodiment, shown in FIG. 10B, the channel 113B has a semi-circular profile in cross-section, and the edge 113A of the elastic skirt 113 has a circular profile. Thus, the edge 113A may be forced into the semi-circular channel 113B, being compressed to pass through the open section of the semi-circular profile of the channel 113B. Once pressed into the semi-circular profile of the channel 113B, the circular profile of the elastic skirt 113 edge 113A re-expands and holds the elastic skirt 113 to the bottom 106 of the vacuum plate body 102 until the elastic skirt 113 is forcibly pulled from the channel 113B.

The vacuum plate body 102, as shown in FIGS. 1-6 may be manufactured from of one or more of a variety of materials, including but not limited to, stamped sheet steel or aluminum, exterior grade plywood sealed with exterior water-proofing, or structural plastic such as acrylonitrile butadiene styrene (ABS), polybutylene terephthalate (PBT), polyethylene terephthalate (PET), polyether ether ketone (PEEK), mixtures of various engineering plastics, resin embedded fiberglass, and other structural materials. Structural features such as ribs on the upper side 104 or lower side 106 of the vacuum plate body 102 may also be added for stiffening and mechanical stability as needed. The vacuum plate body 102 may be manufactured using any technique known in the art, including but not limited to, blow molding, injection molding, vacuum molding, and other similar manufacturing techniques.

A rim of a stiffer material may be added within or on the perimeter 110 of the vacuum plate body 102, for additional strength, and stiffeners such as metallic rods or meshes may be incorporated within the structure of the vacuum plate body 102 for added strength while minimizing added weight to the vacuum plate body 102. While the vacuum plate body 102 may be constructed as a planar body, as shown for example in FIGS. 1, 2, 3, and 5, atmospheric pressure (approximately 14 PSI) may exert extreme downforces on the vacuum plate body 102, particularly when high capacity vacuum pumps 130 are employed and create a large pressure differential between the evacuated collection volume 201 and the ambient environment. Thus, planar vacuum plate bodies 102 may require constructions of more robust materials that may be more costly to use, and result in a heavier, unwieldy vacuum plate body 102. In other embodiments, shown for example in FIGS. 4, 6, and 10A-10B a raised or dome-like vacuum plate body 102 may more evenly distribute atmospheric pressure, and minimize or prevent deformation of the vacuum plate body 102 in operation.

Figure 7:
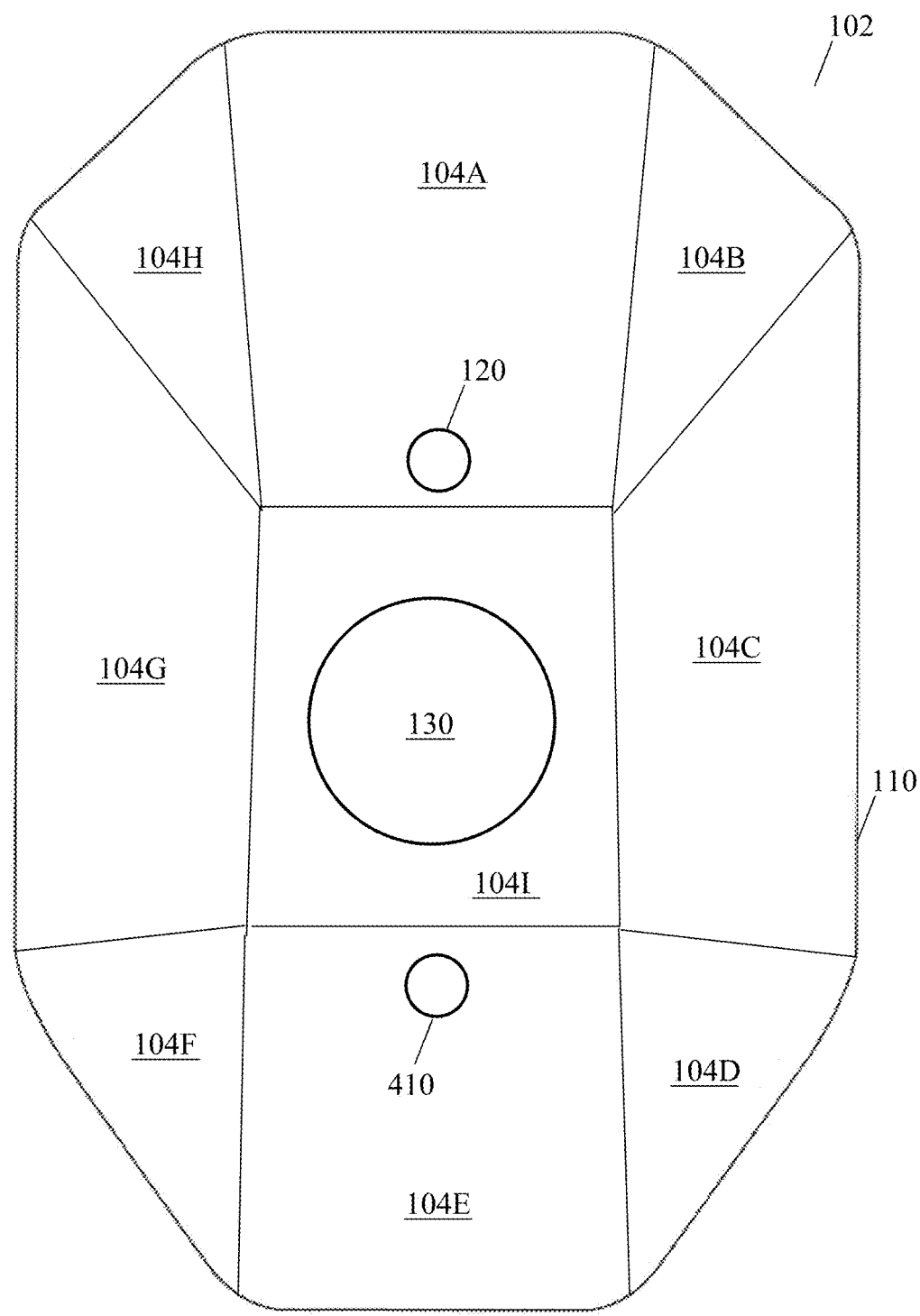
FIG. 7 shows a top view of a raised vacuum plate system formed from multiple planar sections approximating a dome.

In some embodiments, shown in FIGS. 7 and 9-10B, the vacuum plate body 102 is constructed of a structural foam core 700A, 700B, including but not limited to cores made of rigid polystyrene foam, rigid polyurethane foams, and others. As shown in FIGS. 7 and 10A-10B, a cross section of vacuum plate body 102 generally may have a geodesic shape formed by discreet planar segments (104A-104I, FIG. 7) approximating a dome-like shape. A dome-like or geodesic structure may be selected as it provides the greatest structural resistance to ambient air pressure pressing downwardly on vacuum plate body 102 when the vacuum pump 130, shown for example in FIG. 7, is activated and lowers the pressure in the collection volume 201. For the purposes of this description, a "geodesic" structure is understood to be any set of connected planar elements approximating a continuously arcuate surface, such as a continuously arcuate dome.

In some embodiments, the vacuum plate 102 is cut from a monolithic block of foam, using either computer numerical control (CNC) machining or hot wire cutting methods, for example. In other embodiments, the foam core 700A, 700B may be molded in its desired geometry using, for example, reaction injection molding techniques. Approximation of the dome shape with planar segments (104A-104I, FIG. 7) as a geodesic may simplify this process; however other structural geometries may also be suitable.

In some embodiments, shown in FIG. 10A, the vacuum plate body 102 has a flat bottom 106 that results in a very thick vacuum plate body 102. This thick foam core 700A may provide enough strength that it may not deflect downwardly or fracture when the collection volume 201 below the vacuum plate body 102 is evacuated by the vacuum pump 130 and atmospheric pressure presses downwardly on the vacuum plate body 102.

The foam core 700A, 700B may also be coated 510 with a low cost spray-on sealant, such as a water-based latex coating, an acrylic spray, shrink-wrap plastic films, or any other material suitable for application to the foam core in a thin film that will effectively seal pores in the foam core 700A, 700B. Thus, the combination of the self-supporting foam core 700A, 700B and a coating 510 that only acts as a surface sealant results in a very low cost, disposable vacuum plate body 102. Preformed apertures in the vacuum plate body 102 that enable rapid installation or removal of other components, including but not limited to, vacuum pumps 130 and inlet ports 120, make these embodiments ideal for hazardous waste collection, disaster relief operations, or other collection operations where materials being collected may contain chemical, biological, radiological, or other contamination, and secondary contamination is to be avoided. In other words, the vacuum plate body 102 may be disposed along with collected hazardous materials after use, requiring only minimum decontamination of other components such as vacuum pumps 130 and inlet ports 120. If desired, a high efficiency particular air (HEPA) filter or other similar filter may be added to an exhaust port 410 to also prevent ambient air contamination by the vacuum pump 130 exhaust.

In other embodiments, the foam core 700A, 700B of FIGS. 10A and 10B is coated 510 with resin or resin blend to improve structural integrity, provide damage resistance, and protect against fluid and vapor penetration into the foam core 700A, 700B. In one embodiment, polyurea provides a coating 510 that may be sprayed on, cures rapidly, has a very high tensile strength, and high elasticity. However, other elastomeric resins, resin impregnated fiberglass, one or two part epoxy resins, or other structural coatings 510 may alternatively be used.

As shown in FIGS. 1-6, the vacuum plate body 102 may have an intake port 120 passing through the vacuum plate body 102 for connection of a vacuum hose that will be used to collect solid and fluid materials for transfer to the wheelbarrow 105. It will be appreciated that the shown location of the intake port in FIGS. 1-6 is only for illustrative purposes, and that the intake port 120 may be located at any desired location on the vacuum plate body 102. Similarly, one or more additional ports 121 having a removable air tight cap 122 may be located at various locations through the vacuum plate body 102 to allow attachment of hoses or other accessories at various locations on the vacuum plate body 102. The ports 120, 121 may be designed to be operationally couplable to one or more conventional vacuum cleaner accessories or one or more custom vacuum plate system accessories to provide improved vacuum suction for one or more specific purposes.

As shown in FIGS. 1-4 and 7-9, a vacuum pump 130 may also be mounted through the vacuum plate body 102 to remove air from the collection volume 201 formed by the combination of the wheelbarrow 105 tray 10 and vacuum plate body 102 and create a vacuum at the intake port 120. In some embodiments 500, 600, shown in FIGS. 5-6, the vacuum pump 130 may be an independent vacuum source, and operatively coupled to an exhaust port 410 by, for example, a vacuum hose. It will be understood that the shown location of the exhaust port 410 in these figures is for illustrative purposes only, and that one or more exhaust ports 410 may be located at any useful location through the vacuum plate body 102. In the event that more than one exhaust port 410 is incorporated, air tight caps 122, as shown in use with additional intake ports 121, may be used to seal un-used exhaust ports 410.

Figure 13:
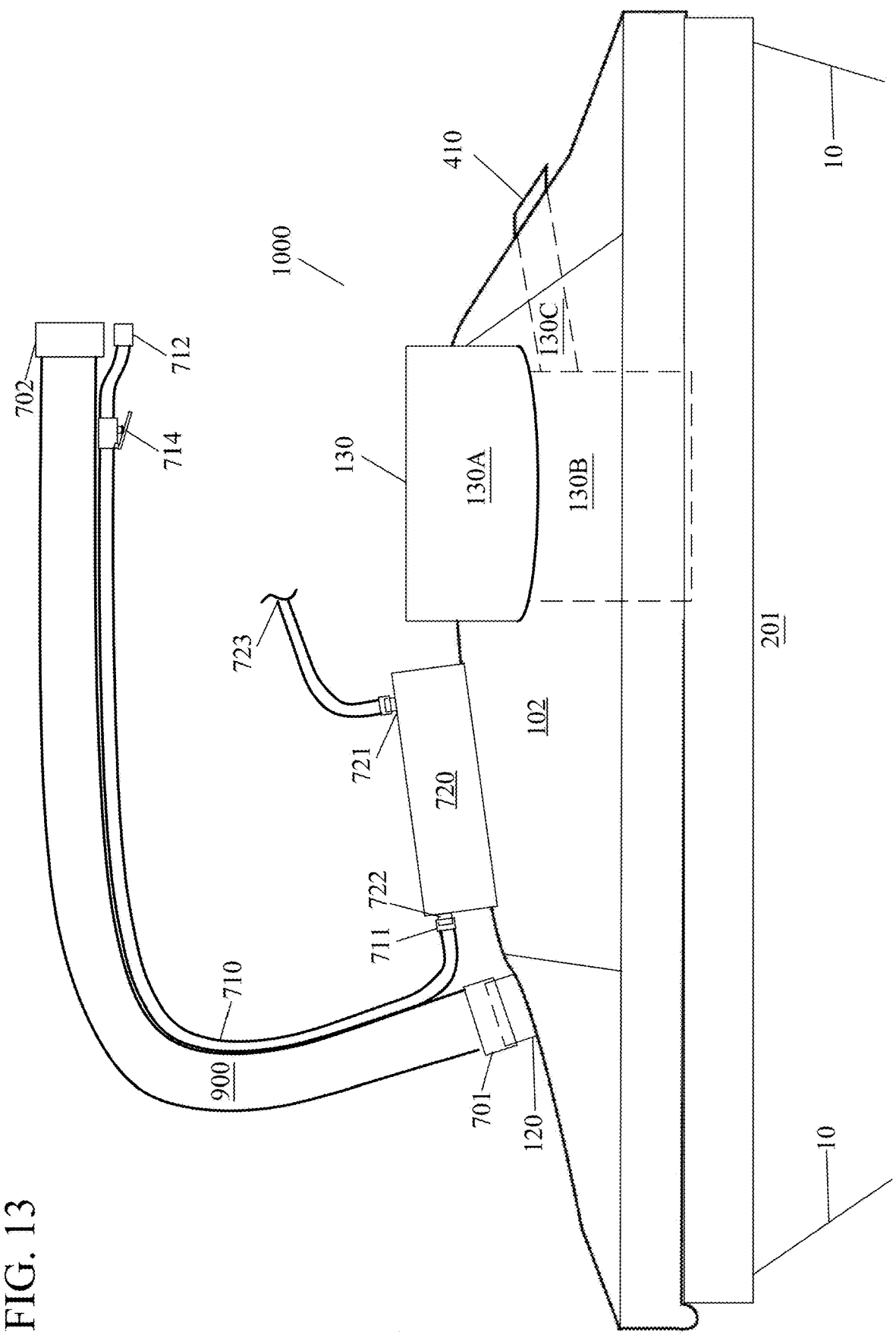
FIG. 13 shows a vacuum plate with a vacuum hose, hydraulic hose, and a water pump.

The bold arrows in FIG. 2 through 5 illustrate the direction of air flow in through the intake port 120, and ultimately exhausted through a single stage vacuum pump 130 or exhaust port 410. In the event that a two stage vacuum pump 130 with a motor cooling stage and a vacuum stage is used, as illustrated in FIG. 13, the output of the vacuum stage may be connected to an exhaust port 410 to evacuate the collection volume 201. It will be appreciated that the vacuum pump 130 may be of a variety of configurations using methods such as fans, squirrel cage impellers, turbine impellers and other mechanical methods to remove air from the collection volume 201, whether as part of a single stage vacuum pump or as a stage of a dual stage vacuum pump. It will also be appreciated that the vacuum pump 130 may be powered by an electric motor or gasoline powered engines.

When the vacuum pump 130 is in operation, the vacuum generated within the evacuated collection volume 201 may be more than sufficient to seal and hold the vacuum plate system 100 firmly in place on the wheelbarrow 105 tray 10 perimeter 108. However, in some embodiments it may be desirable to provide additional fixation of the vacuum plate body 102 to the wheelbarrow 105 tray 10 perimeter 108. As previously described herein, an elastic skirt 113 may serve this purpose.

Additionally or alternatively, as shown in FIG. 1, a plurality of attachment clips 140 may be added to the vacuum plate body 102 in some embodiments to hold the vacuum plate system 100 in place, particularly when the vacuum pump 130 is turned off and the wheelbarrow 105 is being moved. The clips 140 shown in FIG. 1 may be rubber straps with lever action fittings on one end that snap under the perimeter 108 of the wheelbarrow 105 tray 10. Alternatively, a two ply strap 20 including one or more magnets, such as the rare earth type, fixed between the two plies may have one end fixed to the vacuum plate body 102, and another end containing the magnets placed in contact with a metal wheelbarrow 105 tray 10 or other metallic elements of the wheelbarrow 105.

It will be appreciated that a wide variety of mechanisms may be used for connecting the wheelbarrow 105 tray 10 to the vacuum plate body 102, including but not limited to bungee cords with hooks on one end to hook onto the wheelbarrow, formed wire clips with lever actions hooking under the perimeter 108 of the wheelbarrow 105 tray 10, ratchet straps passing from one location on the perimeter 110 of the vacuum plate body 102 and under the wheelbarrow 105 tray 10 to another location on the perimeter 110 of the vacuum plate body 102, and other similar fixation devices. When the vacuum body plate 102 is securely fastened to the wheelbarrow 105 tray 10, the vacuum pump 130 may also be operated in a reverse mode, to generate a stream of high pressure air at the inlet 120 for use as, for example, a leaf blower.

Figure 8:
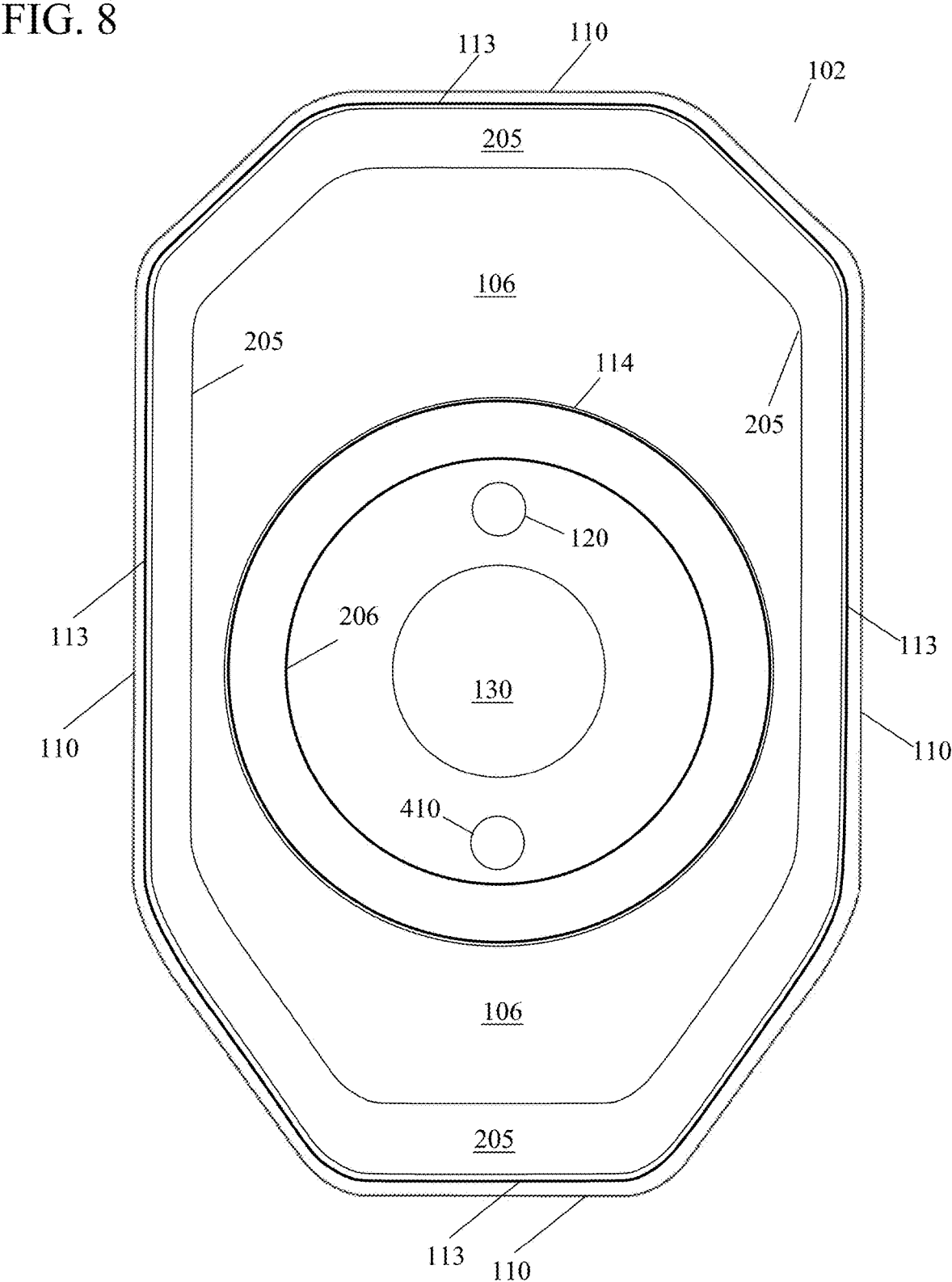
FIG. 8 shows a bottom view of a vacuum plate system having mating surfaces and elastic skirts configured for both a wheelbarrow and a standard 55 gallon drum.
Figure 9:
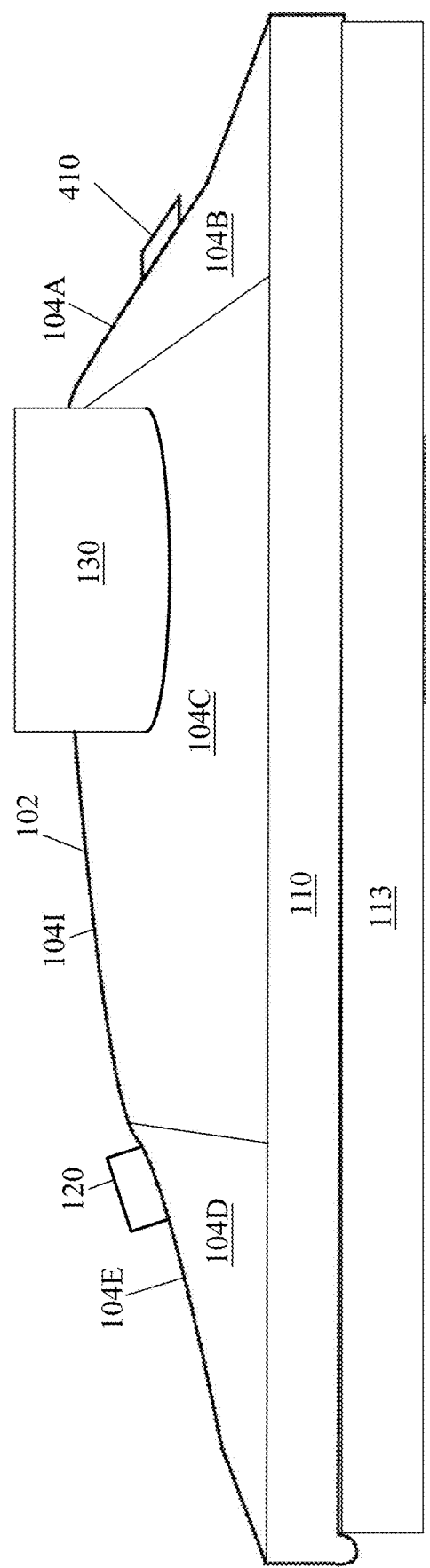
FIG. 9 shows a side view of a raised vacuum plate system formed from multiple planar sections approximating a dome.

As shown in FIG. 2 and FIG. 8, in some embodiments a resilient gasket 205 formed, for example, of rubber, closed cell foam, cork, or other deformable air tight resilient material, may be located adjacent the perimeter 110 of the vacuum plate body 102 on the lower side 106 of the vacuum plate body 102. The gasket 205 may cover an area of the lower side 106 of the vacuum plate body 102 and accommodate a wide range of wheelbarrow 105 tray 10 perimeters 108, thereby forming a mating surface for mating with the perimeter 108 of the wheelbarrow 105 tray 10.

Figure 14:
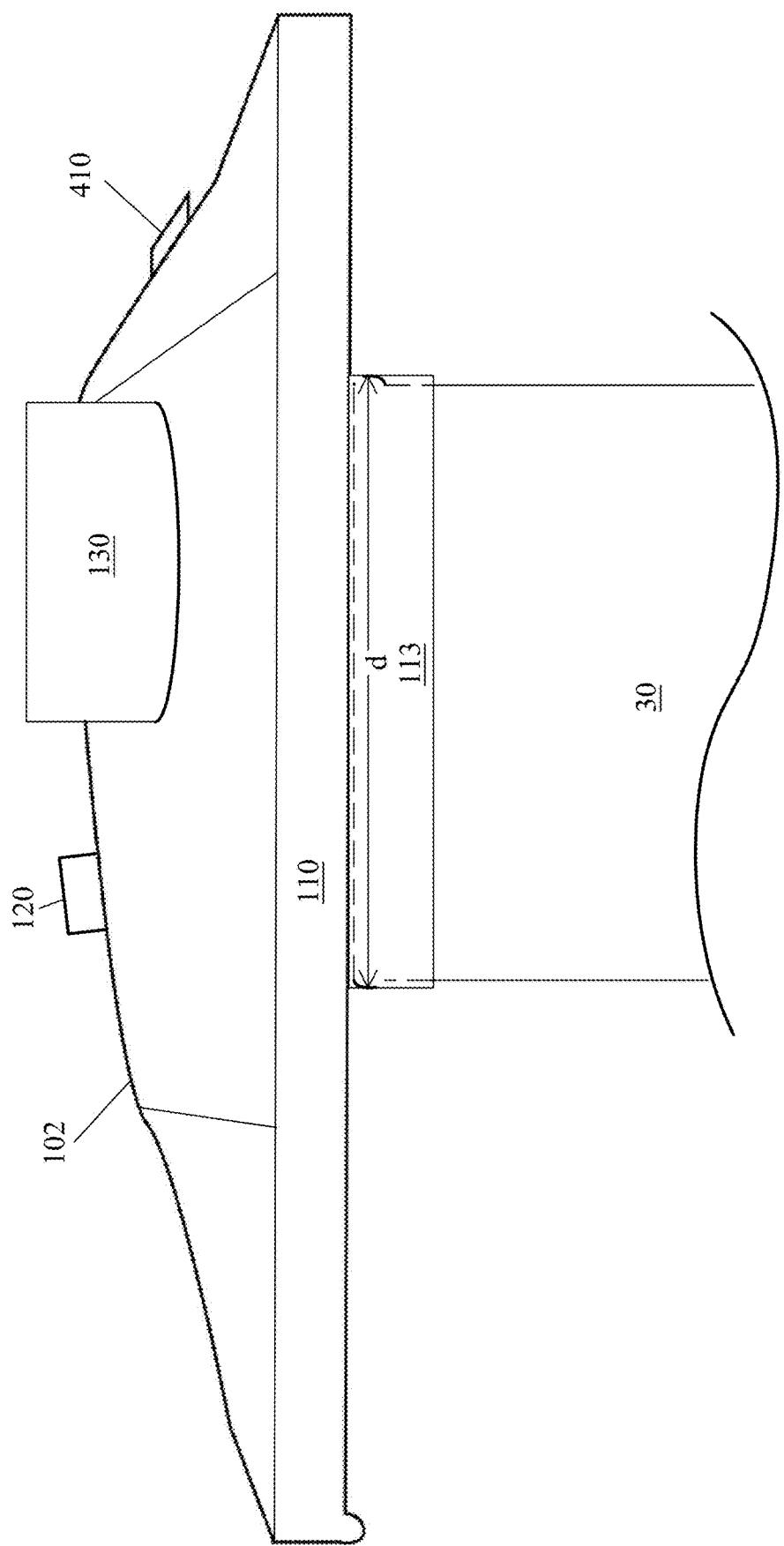
FIG. 14 shows a vacuum plate coupled to an industrial 55 gallon drum.

The gasket 205 also helps ensure a tight seal is formed with the perimeter 108 of the wheelbarrow 105 tray 10 in the event small dents or deformations occur with use of the wheelbarrow 105 over time. In other embodiments, shown in FIG. 8, the bottom 106 of the vacuum plate body 102 may include multiple gasket 205 locations. In this figure, a gasket 205 and skirt 113 form a mating surface for a wheelbarrow 105 tray 10 perimeter 108, and a second gasket 206 with a second skirt 114 form a mating surface for a standard 55 gallon drum 30 or similar drums commonly used as packaging for industrial fluids and bulk liquids for human consumption. The combination of the vacuum plate body 102 and a 55 gallon drum 30 is shown in FIG. 14, where the bottom 106 of the vacuum plate body 102 includes a circular mating surface with a diameter of approximately twenty four inches, the industry standard for a wide variety of drums and barrels in commercial use.

Figure 11:
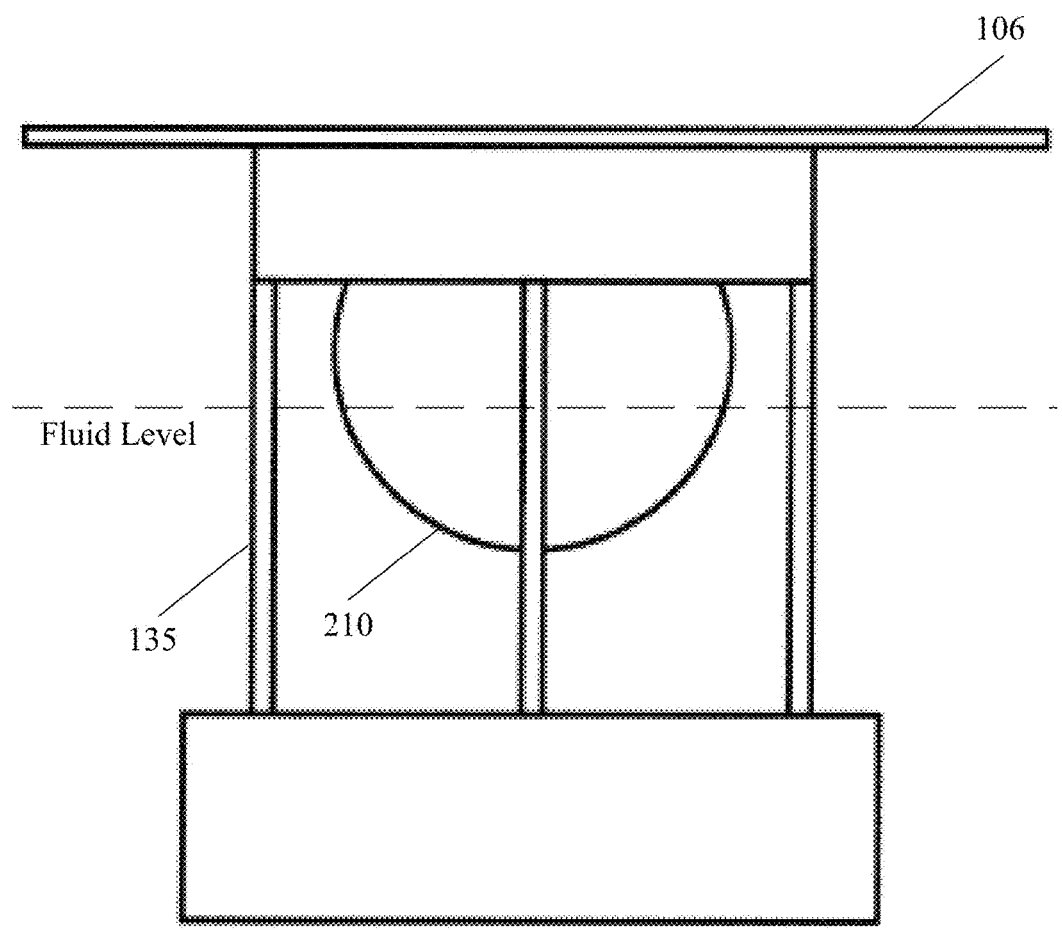
FIG. 11 shows a ball and cage float valve of a vacuum pump.

In some embodiments, the vacuum plate system 100, 200, 300, 400, 500, 600, 700, 1000 may use a lengthy vacuum hose to collect fluids at a substantial distance from the vacuum plate system 100. As a result, the operator may not be able to easily determine when the wheelbarrow 105 tray 10 is filled with fluids and debris. To avoid overflowing the wheelbarrow 105 tray 10, or drawing fluids into the vacuum pump 130, a float valve 210 and a vacuum pump 130 cut off switch 220 may be included in the vacuum plate system 100, as shown in FIGS. 2-3. As the fluid level rises in the wheelbarrow 105 tray 10 collection volume 201, the fluid eventually reaches the level of the float valve 210 and carries it upward toward the vacuum pump 130. At a pre-determined level, the float valve 210 both blocks an intake to the vacuum pump 130 so that it cannot ingest fluid, and also actuates the cutoff switch 220 which stops power to the vacuum pump 130. In some embodiments, the float 210 moves in a cage 135 attached to the vacuum pump 130. In other embodiments, as shown in FIG. 11, a ball float 210 and cage may be used attached to the lower surface 106 of the vacuum plate body 102.

In some collection operations, it may be desirable to separate collected solids from collected fluids, and drain the collected fluids away. For this reason, as shown in FIGS. 2-3, in some embodiments a sump pump 230 and one-way valve 240 may be integrated with the vacuum plate body 102. The one-way valve 240 ensures that vacuum integrity is maintained and no air leaks into the evacuated collection space 201 through the sump pump 230. A one-way valve 240 that only allows fluids to exit the evacuated collection volume 201 may be incorporated in some embodiments for this reason.

Depending on the type of sump pump 230 used, the one-way valve 240 may be located either upstream or downstream from the sump pump 230. A first sensor 250, which may be a float operated switch or other sensor capable of sensing the presence of fluids, may be located on the sump pump 230 assembly at a level below the vacuum pump 130 float valve 210 at the highest allowable fluid level. Thus, when the fluid level in the evacuated collection volume 201 reaches a certain level, the first sensor 250 activates the sump pump 230, drawing fluids through a filter 260, and expelling them from the wheelbarrow 105 tray 10 through a sump exit port 270. The sump exit port may include any type hydraulic fitting known in the art, for example, for attachment to a common garden hose that will carry the waste water to a separate location, such as a drain, a collection barrel, or a garden. Operation of the sump pump 230 may occur while the vacuum pump 130 is operation, or actuation of the sump pump 230 may temporarily suspend operation of the vacuum pump 130 until fluids have been drained to a pre-determined level recognized by a second sensor 251 located below the first sensor 250.

Figure 4:
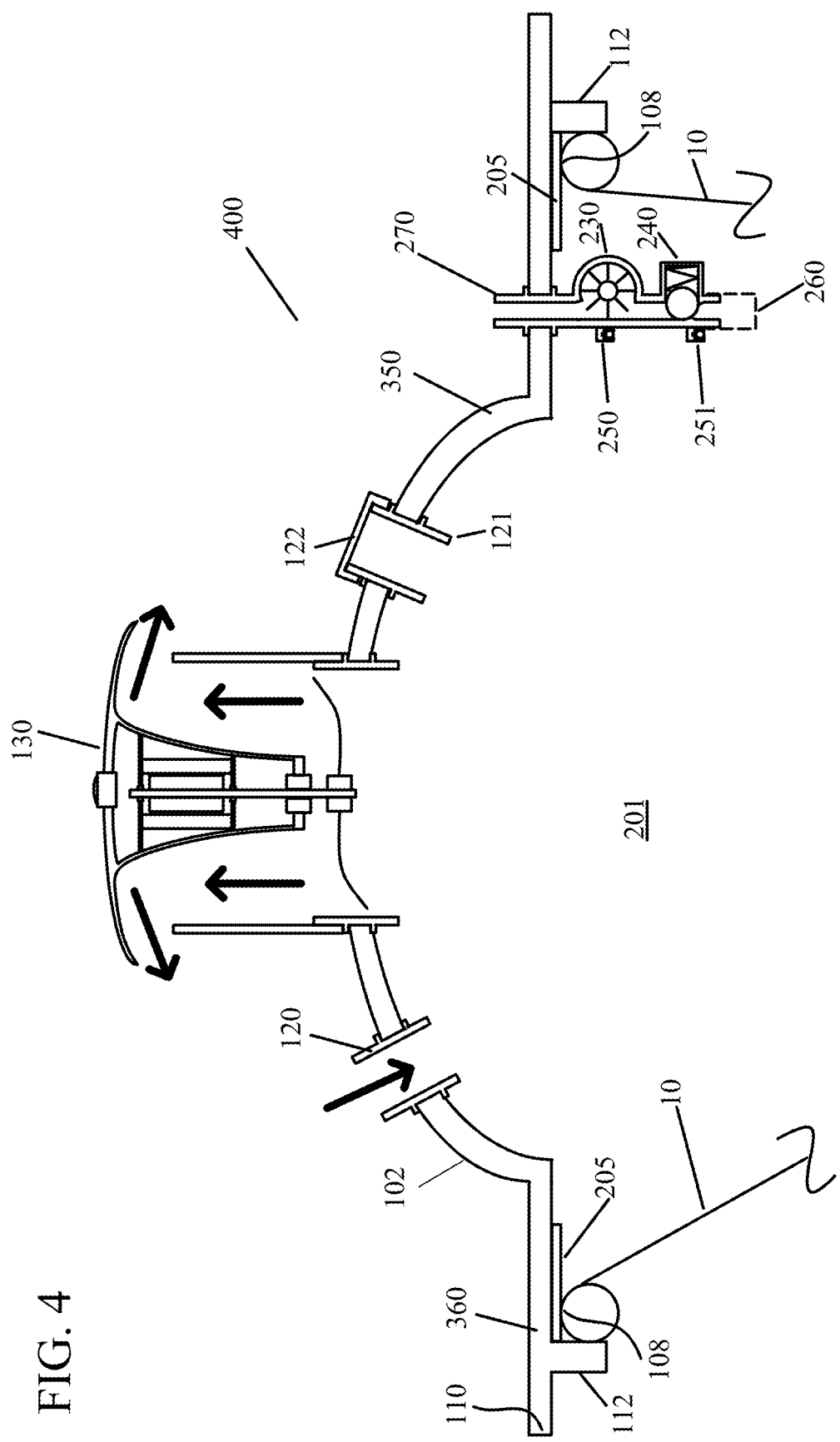
FIG. 4 shows a midline cross sectional view of a wet/dry vacuum plate system with a raised vacuum plate body.

In another embodiment of the vacuum plate system 400, shown in FIG. 4, the vacuum plate body 102 has a domed central section 350 and an outer flange section 360. This configuration provides more space within the collection volume 201, which may be desirable when collecting particulate material such as sand, pea stone, mulch, or other materials that would be preferably piled higher in the evacuated collection volume 201.

In this embodiment, the intake port 120 may be located through a position on the domed portion 350 of the vacuum plate body 102 so that incoming material is directed toward the center of the wheelbarrow 105 tray 10. However, this shown location is only for illustrative purposes, and the intake port 120 may be positioned at any desirable location on the vacuum plate 102. Similarly, one or more additional ports 121 having a removable air tight cap 122 may be located at any convenient location through the vacuum plate body 102 to allow attachment of hoses at various locations on the vacuum plate body 102.

As shown in FIG. 4, the vacuum pump 130 may be elevated well above the perimeter 108 of the wheelbarrow 105 tray 10, and a float valve may not be necessary in this embodiment, since fluids will not reach the vacuum pump 130, and conventional vacuum filters (not shown) may be employed on the vacuum pump 130. However, in this embodiment, a sump pump 230 as described herein may still be desirable to remove fluids, while increasing the volume of solids that may be collected. The fluid level sensor 250 may also be incorporated in this embodiment to stop the vacuum pump 130 when fluid levels reach a point of potentially overflowing the collection volume 201 of the wheelbarrow 105 tray 10.

In alternative embodiments of the vacuum plate system 500, 600, shown in FIG. 5 and FIG. 6, the integrated vacuum pump 130, associated components, and sump pump may be omitted. In these embodiments, an external vacuum source, such as a conventional shop vacuum or industrial vacuum source, may be connected to the exhaust port 410 of the vacuum plate system 100. As in other embodiments, one or more additional ports 121 having a removable air tight cap 122 may be located at additional locations through the vacuum plate body 102 to allow attachment of vacuum hoses at multiple locations.

In some operations, it may be desirable to directly bag collected materials. For example, construction debris, leaves, or materials collected during asbestos remediation efforts may be ultimately disposed of by municipal or commercial disposal services. In other operations, collected fluids or solids may contain oils, biological or chemical contaminants, or other elements that would demand the collection volume 201 of the wheelbarrow 105 tray 10 to be thoroughly cleaned or decontaminated after use.

To facilitate these operations, as shown in FIGS. 10A-10B, a collection volume 201 liner 550 may be coupled to the vacuum plate body 102 so that collected materials fill the liner 550 after collection by the vacuum plate system 100. The liner 550 may be of any geometry forming an internal volume with an open end having a circumference. The liner 550 may be constructed of a disposable plastic sheeting, similar to conventional trash can liners, or may be reusable and constructed of nylon, canvas, or other similar materials.

As shown in FIG. 10A, a channel 520 may be formed in the lower side 106 of the vacuum plate body 102 adjacent the gasket 205, for example. In this embodiment the channel 520 has a semi-circular profile. A mating retaining ring or strip 530 having a circular cross-section may be constructed of rubber or other elastic material, and may be pressed into the channel 520 when a portion of the liner 550 is placed over the channel 520. Thus the retaining strip 530 clamps the open end of the liner 550 into the channel 520 and holds the liner 550 in place on the vacuum plate body 102 until the retaining ring 530 is removed. Multiple pressure equalization ports 540 may be spaced along the channel 520 to allow air flow around the channel 520. Thus, when the vacuum plate body 102 is placed on the perimeter 108 of a wheelbarrow 105 tray 10, and the vacuum pump 130 is activated, the collection volume 201 is evacuated through the equalization ports 540, and the liner 550 is not drawn toward the vacuum pump 130.

In an alternative embodiment, shown in FIG. 10B, a retaining flange 560 may be formed along the lower side 106 of the vacuum plate body 102. The retaining flange 560 may have a trapezoidal cross section that mates with a retaining channel strip 570 that, when pressed over the retaining flange 560, grips the retaining flange 560 and may clamp a liner 550 between the retaining flange 560 and retaining channel strip 570. Multiple equalization ports 540 may also be provided to allow evacuation of the collection volume 201 without drawing the liner toward the vacuum pump 130 or an exhaust port 410.

While the equalization ports 540 of FIGS. 10A-10B are shown as discreet channels, any channel configuration that allows free air flow across a retaining channel 520 or retaining flange 560 may be used. For example, the lower side 106 of the vacuum plate body 102 may be provided with slots at various locations along the retaining channel 520 or retaining flange 560, so that when the liner 550 is affixed to the vacuum plate body 102, air may pass through the slots which are cut to a depth in the vacuum plate body 102, where they are not blocked by the retaining ring 530 or the retaining strip channel 570.

Conventional vacuum systems in the prior art often use canisters or other regularly shaped collection volumes. As a result, distribution of collected material in the collection volume is of little consequence: material drawn into a port at the top of the canister forms a pile in the bottom of the canister and the pile simply accumulates against the walls of the canister as the pile grows higher. In contrast, a wheelbarrow 105 tray 10 often has a non-uniform shape, with a front of the wheelbarrow 105 tray 10 being shallower than the rear of the wheelbarrow 105 tray 10. Thus, when collecting particulate matter, it may be advantageous to bias the flow of material entering the collection volume 201 in a particular direction, for example with material entering from the inlet port 120 being directed in part toward the shallower front of the collection volume 201 and a greater part of the material being directed toward the back of the collection volume 201. In this way, maximum utilization of the collection volume 201 may be achieved by simultaneously filling the collection volume from front to center, and from rear to center, for example.

Figure 12:
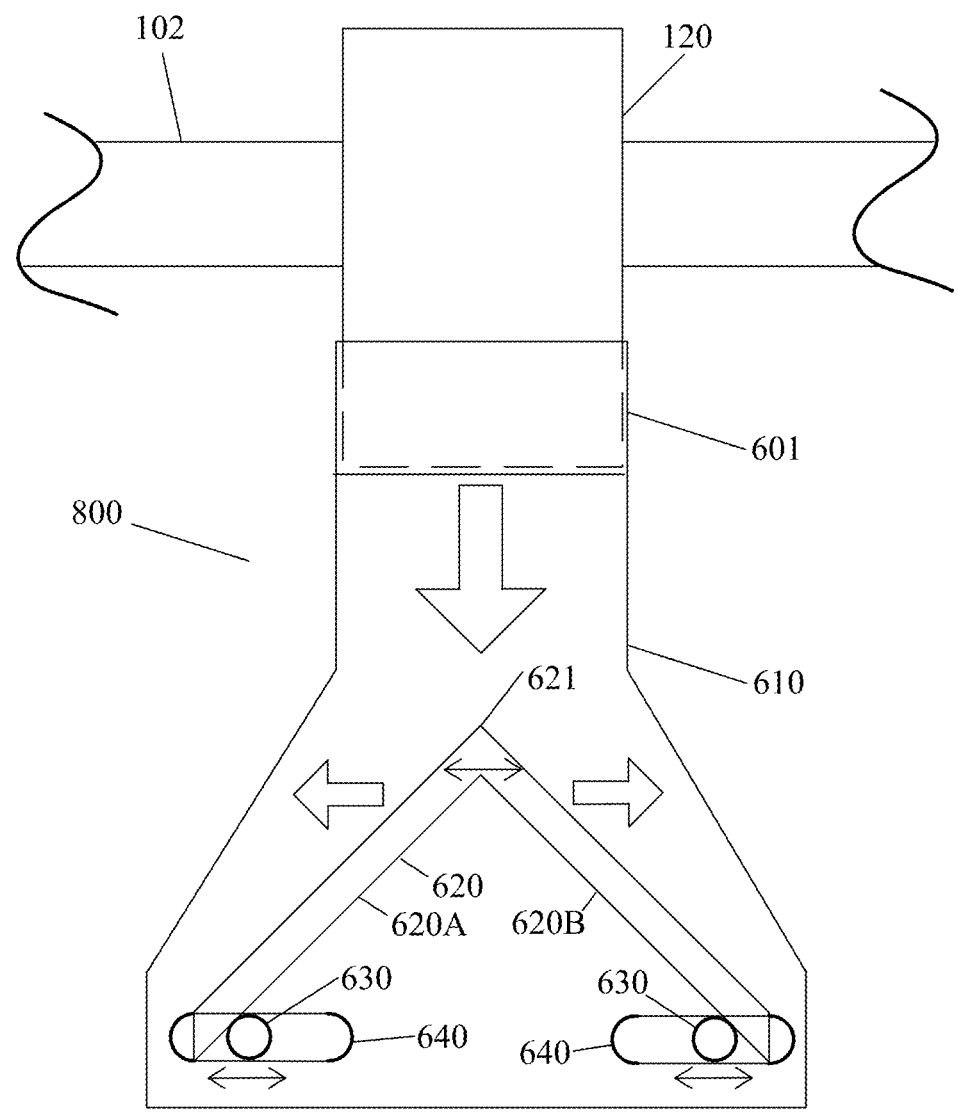
FIG. 12 shows a cross section of a flow deflector coupled to an inlet port of a vacuum plate body.

FIG. 12 shows an embodiment of a flow deflector 800 that may direct material simultaneously toward opposite ends of the collection volume 201, and may also direct different amounts of collected material toward opposite ends of the collection volume. The flow deflector 800 includes a coupling 601 that mates to the inlet port 120 passing through the vacuum plate body 102. This coupling may be threaded, of a split tube and clamp design, or any other type of coupling known in the art that removably attaches the flow deflector 800 to the inlet port 120 and prevents the flow of collected material through the inlet port 120 from separating the flow deflector 800 from the inlet port 120.

The flow deflector 800 includes two support plates 610, only one of which is shown in this cross section, extending downwardly from the coupling 601 with a space between them. A deflection plate 620 with two angled sides 620A, 620B and an apex 621 is located between the support plates 610 and below the coupling 601. Support rods 630 are affixed to the deflection plate 620 and pass through slots 640 in each of the support plates 610. The slots 640 enable the apex 621 of the deflection plate 620 to be translated laterally relative to the inlet port 120. Threads on the ends of the support rods 630 and nuts applied to the threaded ends of the support rods 630 may be used to fix the lateral position of the deflector plate 620 in the slots 640 by tightening the nuts against the support plates 610.

As shown in FIG. 12, when the apex 621 of the deflector plate 620 is generally centered relative to the inlet port 120, material entering the collection volume 201 through the inlet port 120, represented by the large downward arrow, strikes the angled sides 620A, 620B of the deflector plate 620 in roughly equal quantities. Thus, roughly equal quantities of material, represented by the smaller horizontal arrows, are directed in opposite directions by the deflector plate 620. For example, equal amounts of sand passing through the inlet port 120 are directed toward the front (right horizontal arrow) and rear (left horizontal arrow) of the collection volume 201.

However, if the rear of the collection volume 201 may accommodate more collected material than the front of the collection volume, translating the deflection plate to the right causes more material to strike the deflection plate 620 angled side 620A than deflection plate 620 angled side 620B. As a result of this change in position of the deflector plate 620, more material entering the collection volume 201 through the inlet port 120 is directed toward the back of the collection volume 201 (left horizontal arrow) than the front (right horizontal arrow) of the collection volume 201. Proper positioning of the deflector plate 620 may thus control the distribution of collected materials in the collection volume 201, ensuring uniform and efficient filling of the entire collection volume 201.

In some embodiments, the vacuum plate system 100, 200, 300, 400, 500, 600, 700, 1000 may include additional elements, including, but not limited to, one or more vacuum hoses and one or one or more vacuum hose accessories. For example, FIG. 13 illustrates an embodiment of the vacuum plate system 1000 configured for hydro-excavation and other similar operations. The wheelbarrow 105 tray 10 defining the collection volume 201 together with the vacuum plate system 100 forms the core elements of this embodiment.

The vacuum plate body 102 includes a two stage vacuum pump 130 with a first stage 130A having a motor, motor cooling system, and other associated components. A second stage 130B is internal to the vacuum plate body 102 and shown with dashed lines. The second stage 130B is coupled to the first stage 130A to drive the primary vacuum pump components, such as a fan, squirrel cage, or other type known in the art included in the second stage 130B. The second stage 130B is also coupled 130C to an exhaust port 140 that delivers air evacuated from the collection volume 201 to the ambient environment.

A vacuum hose 900 of any type of construction known in the art has a first end coupled 701 to the inlet port 120 of the vacuum plate body 102. This coupling 701 may be of any type vacuum fitting known in the art, but is preferably of a type that requires intentional disconnection via threads, interlocks, or other elements that prevent the fitting from separating from the inlet port 120 when tension is placed on the vacuum hose 900. The vacuum hose 900 may be of any convenient length and has a second end with an accessory coupling 702. The accessory coupling 702 may be of any type know in the art, including, but not limited to, a friction fit coaxial tube type, a twist lock type, a threaded collar and threaded tube type, and others.

A hydraulic hose 710 is also provided with a first end having a hydraulic coupling 711 and a second end having a hydraulic coupling 712. The hydraulic couplings 711, 712 may be of any type known in the art, including, but not limited to, threaded couplings and quick disconnect couplings with or without double shut off capabilities. The hydraulic hose 710 may also include a valve 714 located near the second end coupling 712 of the hydraulic hose 710 so that an operator may control the amount of fluid delivered to the second end coupling 712 and/or the pressure of the fluid delivered to the second end coupling. For operator convenience, the vacuum hose 900 and hydraulic hose 710 are shown in a collinear arrangement that avoids tangling. The vacuum hose 900 and hydraulic hose 710 may be constructed individually and connected along at least a portion of their length by, for example, clips, adhesives, chemical bonding, an outer wrapper or sheath enveloping the two hoses 900, 710, or any other means known in the art. The two hoses 900, 710 may also, for example, be constructed as a single unit with two internal lumens. Alternatively, the vacuum hose 700 and hydraulic hose 710 may be separate elements.

The hydraulic hose 710 first end coupling 711 may be connected to a conventional line pressure water source, or an independent high pressure pump of any type known in the art that has a mating coupling 711, including, but not limited to, pumps used in conventional pressure washer systems. In this embodiment however, the hydraulic hose 710 first end coupling 711 is connected to a mating coupling 722 that is part of a high pressure water pump 720 integrated into the vacuum plate body 102. The high pressure water pump 720 may be electrically driven or driven by a gasoline engine, and has a second coupling 721 for connection of a hose to a water source 723, including, but not limited to, a conventional water tap, a naturally occurring body of water, or a portable water tank. In some embodiments, the water pump 721 may also be adapted to produce steam for distribution from the coupling 722.

With the embodiment shown in FIG. 13, a variety of accessories may be attached to the second end coupling 702 of the vacuum hose 900, and/or the second end coupling 712 of the hydraulic hose 710. Some examples include, but are not limited to, a vacuum pipe and a narrow angle water nozzle for hydro-excavation, or a broad head vacuum brush and wide angle water nozzle for cleaning floors, patios, vehicle exteriors, and other surfaces. In some embodiments, the vacuum hose 900 may be attached to the output of a leaf shredder to replace a bag otherwise used with a conventional leaf shredder.

Other elements may be added to the vacuum plate body 102, including, but not limited to, an electrical cord wrapping cleat, a headlamp, or a vacuum accessory rack, for example.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A plate system for converting a wheelbarrow having an open body with an upper perimeter to a receptacle defining a collection volume of a vacuum cleaner, comprising:
    a vacuum plate body having an upper surface, a lower surface, a resilient gasket, and a flange, the resilient gasket being on the lower surface of the vacuum plate body around a perimeter of the vacuum plate body for forming a seal between the upper perimeter of the body of the wheelbarrow and the lower surface of the vacuum plate body when the vacuum plate system is placed on the body of the wheelbarrow; the resilient gasket covering an area of the lower surface of the vacuum plate body sufficient to fit over the upper perimeter of a plurality of wheelbarrows having open bodies in a range of sizes, the flange extending from the lower surface of the vacuum plate body outward of the resilient gasket at a position located outside the upper perimeter of the wheelbarrow body when the vacuum plate system is placed on the body of the wheelbarrow;
    an intake port communicating through the vacuum plate body from the upper surface of the vacuum plate body to the lower surface of the vacuum plate body and extending away from the upper surface of the vacuum plate body to allow connection of a vacuum hose to the intake port;
    an exhaust port communicating through the vacuum plate body from the lower surface of the vacuum plate body to the upper surface of the vacuum plate body; and
    a vacuum pump mounted to the vacuum plate body.

2. The vacuum plate system of claim 1, wherein the flange comprises an elastic skirt extending from the lower surface of the vacuum plate body, the flange sealing around the upper perimeter of the wheelbarrow body when the vacuum plate system is placed on the body of the wheelbarrow.

3. The vacuum plate system of claim 1, wherein the vacuum pump operates through the exhaust port, such that when the vacuum plate system is placed on the upper perimeter of the tray of the wheelbarrow, and the vacuum pump is activated, air is drawn from the collection volume, defined by the internal volume of the tray of the wheelbarrow and the vacuum plate body, through the exhaust port and air pressure within the volume is reduced relative to an ambient air pressure.

4. The vacuum plate system of claim 1, wherein the vacuum plate body is planar.

5. The vacuum plate system of claim 1, wherein the vacuum plate body comprises a central domed portion and an outer flange surrounding the domed region sized to fit over the upper perimeter of the open bodies of a plurality of wheelbarrows with open bodies in a range of sizes, the resilient gasket being applied to a lower surface of the outer flange.

6. The vacuum plate system of claim 5, wherein the central domed portion of the vacuum plate body comprises a plurality of connected planar surfaces forming the central domed portion.

7. The vacuum plate system of claim 1, further comprising a sump pump with a first sensor and a second sensor located below the lower surface of the vacuum plate body, the sump pump communicating through the vacuum plate body such that, when the first sensor is activated by fluid, contained in a collection volume defined by the internal volume of the tray of the wheelbarrow and the vacuum plate body, reaching a level of the first sensor, fluid is pumped out of the collection volume through the vacuum plate body until the fluid reaches a level of the second sensor such that the second sensor does not detect fluid.

8. The vacuum plate system of claim 1, further comprising a flow deflector coupled to an end of the intake port inside a collection volume defined by the internal volume of the tray of the wheelbarrow and the vacuum plate body by a coupling and two support plates each having two slots, the flow deflector having two angled sides with an apex between them and support rods having two ends passing through the two slots of the support plates, a position of the flow deflector being variable relative to a position of the end of the intake port by moving the flow deflector in the two slots of each of the two support plates, and the position of the flow detector being fixable by fasteners on the two ends of the support rods, such that a material entering the collection volume through the intake port strikes at least a portion of at least one angled side of the flow deflector, and a direction of flow of the material is changed.

9. The vacuum plate system of claim 1, further comprising a water pump having a low pressure intake coupling and a high pressure output coupling mounted on the upper surface of the vacuum plate body.

10. The vacuum plate system of claim 1, wherein the vacuum plate body comprises a foam core with an exterior surface and a coating applied to the exterior surface.

11. The vacuum plate system of claim 10, wherein the foam core of the vacuum plate body is polystyrene foam.

12. The vacuum plate system of claim 10, wherein the coating applied to the exterior surface of the foam core is cured polyurea.

13. The vacuum plate system of claim 1, further comprising a collection volume liner defining an internal volume with an open side having a perimeter, wherein the perimeter is held in a channel with a cross sectional shape formed in the lower surface of the vacuum plate body by an elastic retaining strip with a cross sectional shape mating with the cross sectional shape of the channel, such that the perimeter of the open side of the collection volume liner is held between an inner surface of the channel and an outer surface of the elastic retaining strip.

14. The vacuum plate system of claim 1, further comprising a collection volume liner having an internal volume with an open side having a perimeter, and the perimeter is held on a flange with a cross sectional shape on the lower surface of the vacuum plate body by a retaining strip with a cross sectional shape mating to the cross sectional shape of the flange, such that the perimeter of the open side of collection volume liner is held between an inner surface of the retaining strip and an outer surface of the flange.

15. The vacuum plate system of claim 1, in which the resilient gasket is formed of a material selected from a group consisting of rubber, silicon rubber, closed cell foam and cork.

16. The vacuum plate system of claim 1, wherein the vacuum pump is configured to move fluid through the vacuum plate body from the lower surface to the upper surface, thereby causing vacuum force through the intake port from the upper surface of the vacuum plate body to the lower surface of the vacuum plate body.

17. The vacuum plate system of claim 1, wherein the vacuum pump is in the exhaust port.

18. The vacuum plate system of claim 1, wherein as a result of the vacuum pump being operated and the vacuum plate and resilient gasket mating around an entirety of the upper perimeter of the body of the wheelbarrow, a vacuum generated within the collection volume holds the vacuum plate system firmly in place on the upper perimeter of the body of the wheelbarrow.

* * * * *